(12) United States Patent
Di Sirio et al.

(10) Patent No.: US 8,550,363 B2
(45) Date of Patent: Oct. 8, 2013

(54) INTEGRATED CIRCUIT CARD AND CORRESPONDING PROGRAMMING PROCESS

(75) Inventors: Giovanni Di Sirio, Salerno (IT); Giovanni Fontana, Naples (IT)

(73) Assignee: STMiroelectronics International N.V., Geneva (CH)

( * ) Notice: Subject to any disclaimer, the term of this patent is extended or adjusted under 35 U.S.C. 154(b) by 283 days.

(21) Appl. No.: 12/959,945

(22) Filed: Dec. 3, 2010

(65) Prior Publication Data
US 2011/0138088 A1 Jun. 9, 2011

(30) Foreign Application Priority Data

Dec. 4, 2009 (IT) .............................. MI2009A2143

(51) Int. Cl.
G06K 19/06 (2006.01)
G06F 13/28 (2006.01)
G06F 5/00 (2006.01)
G06F 13/42 (2006.01)
G06F 13/00 (2006.01)

(52) U.S. Cl.
USPC ................. 235/492; 710/22; 710/26; 710/48; 710/106; 711/100; 711/103

(58) Field of Classification Search
USPC ......... 235/492; 710/22, 26, 48, 106; 711/100, 711/103
See application file for complete search history.

(56) References Cited

U.S. PATENT DOCUMENTS

| 6,415,350 | B2 * | 7/2002 | Asoh | 711/103 |
| 2001/0029565 | A1 | 10/2001 | Kaki et al. | 711/103 |
| 2007/0005829 | A1 * | 1/2007 | Fujimoto | 710/48 |
| 2009/0164815 | A1 * | 6/2009 | Ohyama | 713/320 |
| 2010/0005199 | A1 * | 1/2010 | Gadgil | 710/22 |

FOREIGN PATENT DOCUMENTS

WO 01/29762 4/2001

* cited by examiner

*Primary Examiner* — Michael G Lee
*Assistant Examiner* — Laura Gudorf
(74) *Attorney, Agent, or Firm* — Allen, Dyer, Doppelt, Milbrath & Gilchrist, P.A.

(57) ABSTRACT

An integrated circuit (IC) card may include non-volatile memory portions, where external data files are storable, and including volatile memory portions and a microprocessor. The IC card further may include a serial interface that stores the external data file as received into the volatile memory portions, and at least an internal register that is programmable through the serial interface. The internal register manages according to the programming a serial storing into the non-volatile portions of the external data file already stored into the volatile memory portions. The serial interface and the internal register may manage the respective programming in a parallel manner.

20 Claims, 3 Drawing Sheets

Tc = I/O COMMAND TIME
Tr = I/O RESPONSE TIME
Ts = IC CARD COMMAND EXECUTION TIME
Tt = TERMINAL COMMAND EXECUTION TIME
Tw = REQUEST TIME TO WRITE

INTEGRATED CIRCUIT CARD AND CORRESPONDING PROGRAMMING PROCESS

FIELD OF THE INVENTION

The present disclosure relates to an Integrated Circuit (IC) Card and related methods.

BACKGROUND OF THE INVENTION

An IC Card is a pocked-sized card with embedded integrated circuits which manage processes and store data. In particular, the IC Card usually comprises a non-volatile memory portion, a volatile memory portion, a microprocessor, and a security logic, if any. Programming data and sensitive date can be written and read in these non-volatile and volatile memory portions.

The IC Card works according to programs or instruction flows that should be suitably stored in its non-volatile memory portion by way of an initial programming process. Generally, the programs or instruction flows are provided from a supplier or producer of the IC Cards and are loaded by an initialization device that is interfaced with the IC Card. In particular, during the initial programming process, a set of predefined commands transfer a large amount of input data from the initialization device to the IC Card while the microprocessor manages the storing of data into the non-volatile memory portion.

Subsequently, customization phases allow storing of sensitive information and details referring to the IC Card user. In this case, in order to avoid unwanted widespread dissemination of these sensitive data, security circuits are embedded in the IC Card.

Referring to FIG. 1, a typical programming process is schematically shown therein. In particular, a terminal of the initialization device or reader 1 transmits data files to an IC Card 3 that stores the external data in a non-volatile memory portion 4. The IC Card 3 also comprises a microprocessor 5 that allows for the management and the control of the data files as received as well as the storing of the same into the non-volatile memory portion 4. More particularly, the initial programming process may comprise a start phase where the reader 1 sends to the IC Card 3 a pre-input signal 10 (being shown by a hatched line), and the IC Card 3 sends to the reader 1 a pre-output signal 11 (being also shown by a hatched line), when it is ready to receive data files. Subsequently, the initial programming process may comprise a plurality of transmitting phases where a corresponding set of packets of data files is forwarded by the reader 1 toward the IC card 3.

According to FIG. 1, the initial programming process may comprise a first transmitting phase where the reader 1 sends to the IC Card 3 a first input signal 12 that comprises a first packet of data files, and the IC Card 3 sends to the reader 1 a first output signal 13 after the data file of this first packet has been transmitted and stored into the non-volatile memory portion 4.

Moreover, the initial programming process may comprise a second transmitting phase that substantially corresponds to the first transmitting phase and where a second input signal 14, that comprises a second packet of data files, is sent from the reader 1 towards the IC Card 3. A second output signal (not shown) is also sent from the IC Card 3 to the reader 1 when the data files of the second packet have been completely transmitted and stored into the non-volatile memory portion 4. The initial programming process goes on by subsequent transmitting phases until all packets of data files are sent and a stop signal is send from the reader 1 to the IC Card 3.

Substantially, the initial programming process is a synchronous process, namely a new packet of data files is sent from the reader only after the previous packet of data files is completely stored into the non-volatile memory portion. In FIG. 1, the timing of the programming process is also indicated. In particular, it is to be remarked that the first transmitting phase shows: a start-uptime Tc: time needed by the first input signal 12 to reach the IC Card 3, a holding time Ts: time needed by the IC Card 3 to execute the writing command and to store the packet of data files into the non-volatile memory portion, this holding time corresponding to the time interval between receiving the first input signal 12 and sending the first output signal 13; a returning time Tr: time needed by the first output signal 13, being transmitted to the IC Card 3, for arriving to the reader 1; and a waiting time Tt: time needed by the reader 1 for preparing and forwarding a next packet of data files to the IC Card 3.

Moreover, the holding time Ts further may comprise: a preparation time Tp: during which the non-volatile memory portion 4 of the IC Card 3 is ready to store a first packet of data files; and a writing time Tw: during which data files of the first packet are completely written into the non-volatile memory portion 4, being in particular, $Tw \leq Ts$. Subsequently, the above indicated timing sequence is re-started beginning by a further start-up time Tc.

The initial programming process thus may require a long execution time, being the time needed for storing a packet of data file at least equal to the holding time Ts, i.e. the time during which the packet of data files has been completely written into the non-volatile memory portion and all checks for a correct storing are completed. Thus, in order to store all N-packets of data files into the non-volatile memory portion of the IC Card 3, the total time being substantially equal to N*Tp.

Moreover, the IC Card 3 may require an updating programming process where parts of the data files having been already stored into the non-volatile memory portion are added or substituted. The updating programming process substantially corresponds to the initial programming process both in terms of commands and time.

During the initial and updating programming processes, a large amount of data is transferred/written from the reader to the IC Card, but the management and the execution time turn out to be very long. The execution speed of the processes may be reduced with high manufacturing cost.

SUMMARY OF THE INVENTION

The problem underlying the present disclosure may be to provide a simple and easy way to reduce the execution time of the initial and updating programming processes, thus realizing an IC Card and a process for storing data files that may allow for reduction of the programming time and for structural and functional features to ensure a complete and fast data file storage.

The approach may include providing a programming process that allows both to receive data from the reader and to store data into the non-volatile memory, thereby greatly reducing the execution time and without increasing the manufacturing cost.

According to this approach, an IC card may comprise non-volatile memory portions for storing a plurality of external data files, volatile memory portions, a microprocessor, a serial interface that stores the external data files as received in the volatile memory portions, and at least one internal register that is programmable through the serial interface. The internal register may manage according to the programming a serial storing into the non-volatile memory portions of the external data files already stored in the volatile memory portions. The serial interface and the internal register may manage the respective programming in a parallel manner.

The IC card further may comprise formatting means or a formatting module suitable to transform the external data files into corresponding data pages being stored into the volatile memory portion, each of the data pages having predefined sizes. In particular, the internal register may be a memory of the FIFO type.

The IC card further may comprise writing means or a writing module suitable for storing the data pages into the non-volatile memory portions according to the programming of the internal register, and control means or a controller being suitable to control a storing means or a memory and the internal register in a substantially independent mode with respect to the serial interface. This memory may comprise a Direct Memory Access element being interfaced with the internal register. Advantageously, the serial interface may be a Universal Asynchronous Receiver-Transmitter element.

A process for storing data files in an IC card may comprise non-volatile memory portions, storing a plurality of external data files, and comprising volatile memory portions and a microprocessor. The process may comprise a first phase of storing that stores in a serial mode the external data files into the volatile memory portions by programming in a corresponding mode an internal register, a second phase of storing that, according to the programming of the internal register, stores in a serial mode into the non-volatile memory portions the external data files already stored into the volatile memory portions, and managing the first serial storing phase and the second serial storing phase in a parallel mode with respect to each other.

Advantageously, the first serial storing phase may further comprise transforming each one of the external data files as received into corresponding data pages, each one of the data pages having predefined sizes. The first serial storing phase may comprise using a memory of the FIFO type as an internal register, and using a Universal Asynchronous Receiver-Transmitter element in order to receive and to store the external data files. The programming process may further comprise controlling the first serial storing phase, the second serial storing phase and the internal register in a mode being substantially independent to each other.

BRIEF DESCRIPTION OF THE DRAWINGS

The features and advantages of the embodiments of the present disclosure may be apparent from the description given below by way of an indicative and non-limiting example given with reference to the annexed drawings.

DETAILED DESCRIPTION OF THE PREFERRED EMBODIMENTS

Figure 1:
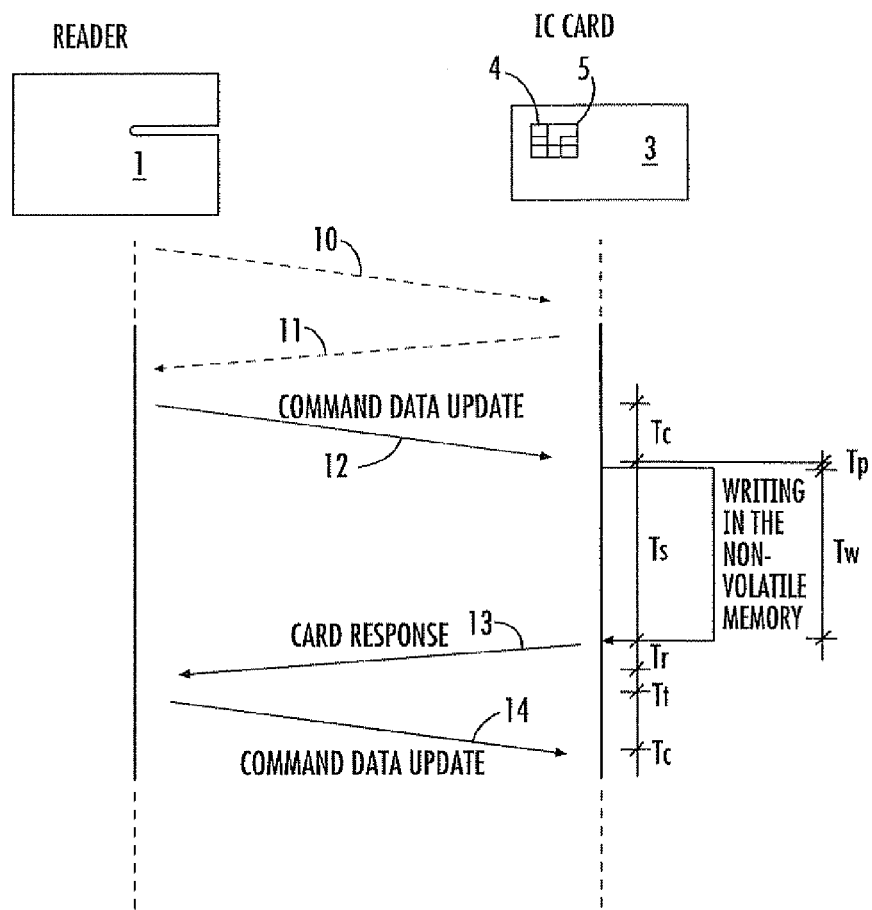
FIG. 1 is a timing diagram for an IC Card and a reader in a programming process, according to the prior art.

Referring to the figures, an IC Card according to the present disclosure is schematically shown and globally indicated with 20. In particular, the IC Card comprises volatile memory portions 25, for example, a RAM, and non-volatile memory portions 30, for example, a ROM and/or an EEPROM or the like. Moreover, the IC Card 20 comprises a microprocessor 35 that carries out the program instructions for the management of the programming process and the control of the data.

The IC Card 20 also comprises a synchronous serial interface as a Universal Asynchronous Receiver-Transmitter (UART) 45 element. Typically, the UART element converts data between parallel and serial modes and it is used for serial/parallel communications between IC Card and peripheral device ports. A reader 50 is interfaced with the IC Card 20 for transmitting the initialization data, which has to be stored into the non-volatile memory portions 30. The initialization data are contained within data files.

Advantageously, according to the present disclosure, the IC Card 20 is interfaced with the reader 50 by the UART element 45 that receives the data files transmitted by the reader 50 and stores these data files into the volatile memory portions 25. The IC Card 20 further comprises at least an internal register 27 preferably included in the volatile memory portions 25.

Moreover, the IC Card 20 comprises a formatting module (not shown) that is suitable for formatting or transforming the data files in one or more data pages 21, which are stored into the volatile memory portions 25. The data pages 21 are pages having predefined sizes, that substantially correspond to the sizes of the hardware physical memory pages, in such a way to optimize the use of the data pages 21, both in terms of transfer time and occupied area.

The internal register 27 is suitably programmed by the UART element 45 in order to map and/or schedule the data files as received, i.e. the corresponding data page 21 being stored into the volatile memory portions 25 by the UART element 45. In particular, the internal register 27 comprises a set of elements 28 each one being associated to a data page 21 by predefined identification fields. By way of example an element 28 could comprise: an identification field that comprises a pointer to a corresponding data page 21 being associated and already stored into the volatile portion 25; and a portion field that comprises a reference to a data file portion already stored that should be updated, this field being generally used in updating program process.

Each data file 21, being transmitted by the reader 50 towards the IC Card 20, is received by the DART element 45 and transformed by the formatting module into corresponding data pages 21 that are temporally stored into the volatile memory portions 25. Thus, a pointer is stored into the corresponding element 28 of the internal register 27 by the DART element 45 and the microprocessor 35.

The internal register 27 is a memory of the FIFO type, where the first input element is the first output element. The IC Card 20, according to the present disclosure, further comprises storing means or a memory controller (not shown in the figures), which store the data pages 21 into corresponding definitive data pages 40, that define the programs and instruction flows for the working of the IC Card 20 itself.

Advantageously, due to the FIFO internal register 27, the storing of the data pages 21 into the non-volatile memory portion 30 is carried out in a serial mode and therefore in the same order used being by the reader 50 to transmit the data files. Moreover, the FIFO internal register 27 allows to the memory controller to simultaneously store the data pages 21, and thus in a parallel mode, store into the volatile memory 25 of the other data files being received to the UART element 45. In this way, the FIFO internal register 27 and the UART element 45 are working substantially in an independent and parallel mode with respect to each other.

Moreover, the IC Card 20 comprises control means or a controller being suitable for verifying that the internal register 27 is empty or full and for verifying the working of the memory controller in order to control that the definitive data pages 40 are correctly stored. In particular, the controller allows control of the working of the reader 50 by transmitting a stop signal, a waiting signal or an error signal to the reader 50 directly, when the internal register 27 is respectively empty, full or when an error occurs when storing.

Advantageously, the controller operates in a substantially asynchronous mode with respect to the UART element 45 and to the internal register 27. Accordingly, one of them can be suspended if a control is not passed without the IC card being completely blocked and therefore the management of the data being externally received and internally stored.

Moreover, the controller controls the programming of the internal register 27 in order to avoid the presence of duplicate data pages 21 being stored into the volatile memory 25. A control or check is made on the identification fields of the elements 28 already present for each data page 21 to be inserted in an element 28 of the internal register 27. In this way, the data pages 21 eventually already present can be substituted by the updated data page 21. This mechanism avoids unhelpful storing of double data files, further reducing the programming time.

Other controls can be obviously made on the content of each data file as received from the reader 50 and on the content of the corresponding data pages 21 or on a portion of the same (checksum), such controls differing in terms of execution speed. In an embodiment, the IC Card 20 comprises an element of direct access to the memory or DMA element (not shown). The DMA element is interfaced with the internal register 27 and, after being activated by the microprocessor 35, manages the storing into the portion of non-volatile memory 30 of the data files 21 already stored in the portion of volatile memory 25.

Advantageously, due to the present embodiment and in particular to the presence of the UART element and eventually of the DMA element, during the programming process, the microprocessor 35 is substantially in an inactivity state while managing the initialization of such elements only. Substantially, according to the present disclosure, the internal register 27 and the DART element 45, being interfaced with the reader 50, implement a process of asynchronous programming, although individually allowing realization and management of programming in a serial mode.

In particular, this allows saving of execution time both during the initial programming and during the updating process. Moreover, the DART element 45, being substantially asynchronous, works independently of the microprocessor 35 and, in particular, manages the data files as received from the reader 50 also when the microprocessor 35 and the volatile memory portion 25 are not ready to store such data files.

Figure 2:
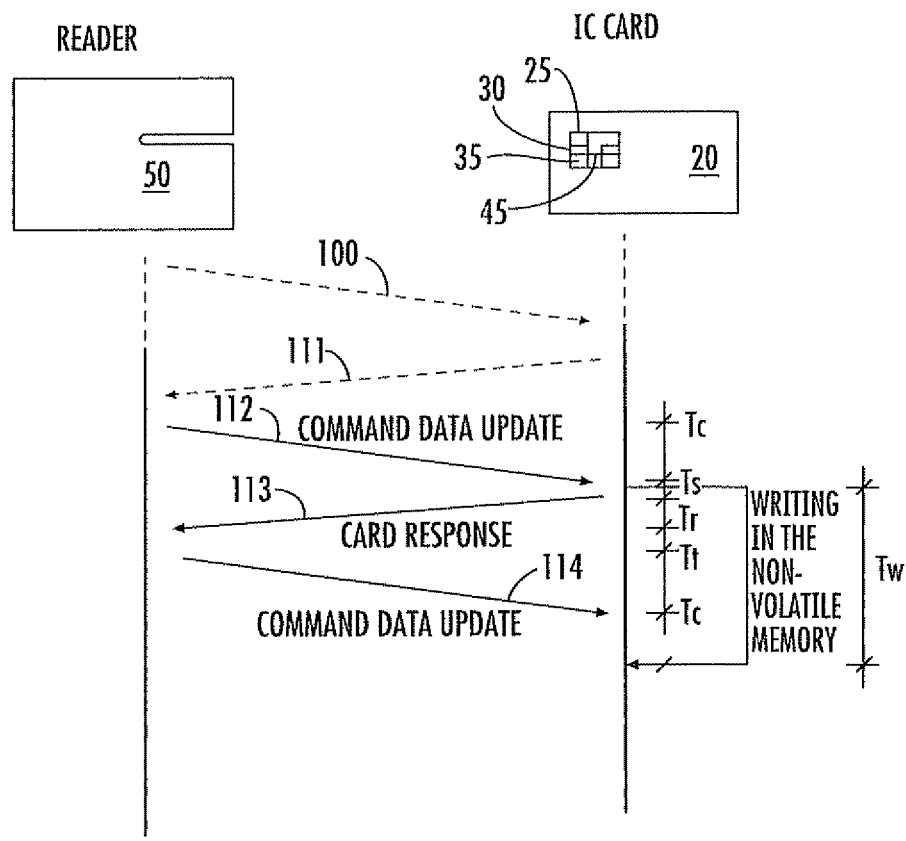
FIG. 2 is a timing diagram for an IC Card and a reader in a programming process, according to the present disclosure.
Figure 3:
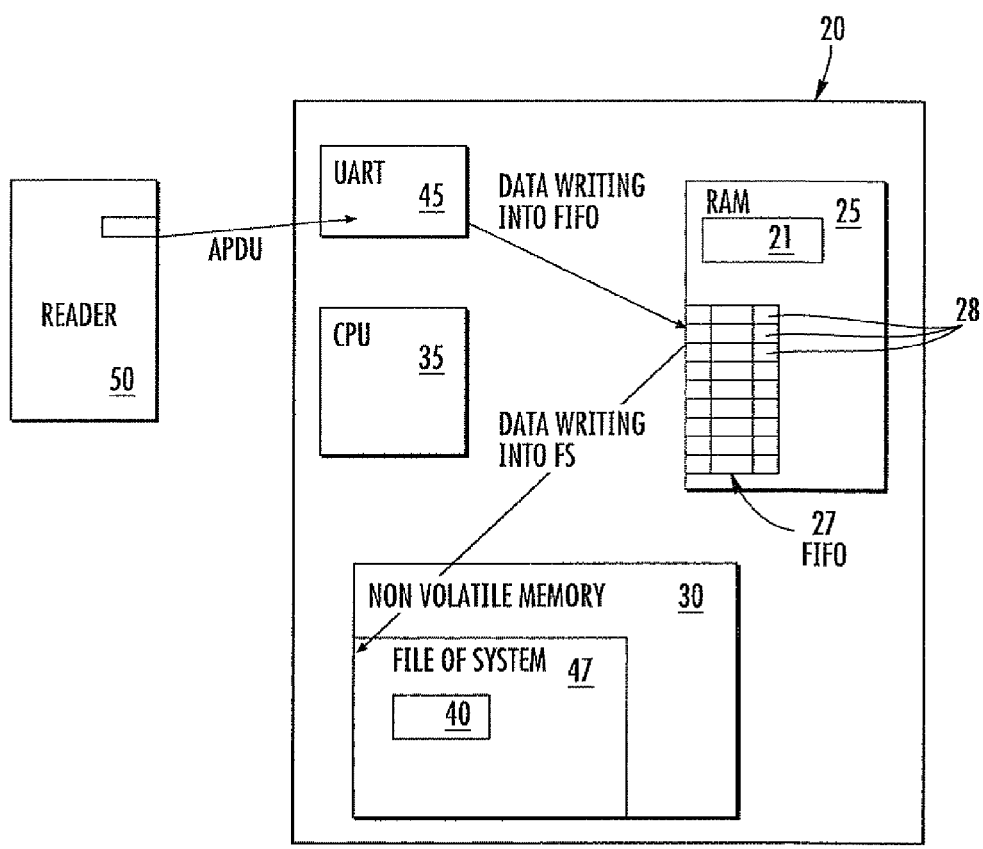
FIG. 3 is a schematic diagram of the IC Card and of a reader, according to the present disclosure.

Referring to FIG. 2, a programming process, according to the present disclosure, is schematically shown therein. The programming process can be an initial process or an updating process, and comprises: a first phase of transmitting: where the reader 50 sends to the IC Card 20 a pre-input signal 100 (being shown by a hatched line), and the IC Card 20, in particular the microcontroller 35, sends to the reader 50 a pre-output signal 111 (being also shown by a hatched line), when it is ready to receive data files.

Subsequently, the programming process comprises a plurality of transmitting phases where a corresponding set of packets of data files is transmitted by the reader 50 toward the IC Card 20 and received from the UART element 45. Thus the programming process comprises a first transmitting phase where the reader 50 sends to the UART element 45 a first input signal 112 that comprises a first packet of data files. The UART element 45 sends to the reader 50 a first output signal 113, after the first packet of data files has been completely and correctly received from the UART element 45.

Moreover, the programming process comprises a second transmitting phase that substantially corresponds to the first transmitting phase and where: a second input signal 114, that comprises a second packet of data files, is sent from the reader 50 to the UART element 45; and a second output signal (not shown) is sent from the UART element 45 to the reader 50 when the second packet of data files has been completely and correctly received.

The programming process goes on by subsequent transmitting steps until all packets of data files are sent and a stop signal is send from the reader 50 to the IC Card 20. Advantageously, according to the present disclosure, the UART element 45, the microprocessor 35, and the internal register 27 allow management in a parallel mode with respect to each other: a first storing phase that stores in a serial mode the external data files into the volatile memory portions 25 and programs in a corresponding mode the internal register 27 by identifying the data files that have been stored; and a second storing phase that according to the programming of the internal register 27 stores in a serial mode into the non-volatile memory portions 30 the data files that have been already stored into the volatile memory portions 25.

Moreover, during the first serial storing phase, the UART element 45 and suitable transforming means or a transforming module allow transformation of the external data files into corresponding data pages 21, each page having predefined sizes. Advantageously, the internal register 27 is a FIFO register and each element 28 comprises predefined identification fields that identify in a corresponding mode each data page 21.

In this way, the programming process is asynchronous and a new packet data file is transmitted to the IC Card 20 and stored into the volatile memory portions 25 while a previous data file is stored into the non-volatile memory portion 30. Moreover, according to the present disclosure, it is possible during the programming process to carry out controls on the first serial storing phase, on the second serial storing phase and on the internal register 27 simultaneously and in substantially independent mode to each other. This, advantageously, allows maintaining a storing phase while the other storing phase is temporally stopped, for instance if a control or check is not passed.

Furthermore, the process provides such controls or checks in order to verify if the internal register 27 is empty or full and to forward a corresponding signal to manage the first storing phase or the second storing phase. Moreover, the process provides controls or checks during the programming of the internal register 27 by verifying that double data pages 21 are not stored. In particular, these controls are carried out by comparing the identification fields of the new data pages 21 to be inserted with the content of the elements 28 already in the internal register 27, and if a data page 21 is present, it is replaced with the new data page, being the latter the updated version.

Also, if the internal register 27 is full, then a waiting signal is sent directly to the reader 50 by the control means while at the same time. The second storing stage continues emptying the internal register 27 and also allows the receipt of further data files. Additionally, the programming process verifies that the transmitted data are properly stored both during the first storing phase and during the second storing phase.

In particular, if an error occurs during the second storing phase, the controller sends an error signal to the reader 50 to re-send the data file corresponding to the data page 21, which has been wrongly stored. This error signal is sent in particular by the controller to the reader 50 in one of the subsequent output signals 113. While the corresponding data file is identified by the identifier being contained into the internal register 27 and processed by the transforming module.

In this way, advantageously, the control signals are processed in an asynchronous way or in an independent mode with respect to the input signals 114 as received by the UART element 45. Finally, the second storing phase can also comprise additional controls or checks that in particular allow for reading the data only after a storing of them into the non-volatile memory portion 30.

In FIG. 2, the timing of the programming process, according to the present disclosure is also given. In particular, during the first programming phase, there are: a start-up time Tc: time used by the first input signal 112 to reach the IC Card 20; a holding time Ts: time used by the UART element 45 for receiving the data files; a return time Tr: time used by the first output signal 113 being transmitted from the UART element 45 to reach the reader 50; and a waiting time Tt: time used by the reader 50 for preparing and sending a next packet of data files to the IC Card 20.

Moreover, according to the present disclosure, the second phase of storing further includes: a writing time tw: time used to store data files stored into the volatile memory portion 25 and then into the non-volatile memory 30 according to the programming of the internal register 27. In this way, the writing time Tw is overlapped, independent and untied from the holding time Ts, from the return time Tr and the waiting time Tt.

The IC card 20, according to the present disclosure, may have a very short transfer time with respect to one of the prior art. In fact, it has a masking and an overlapping of the two phases of storing that run independently to each other. Furthermore, the holding time Ts that mainly depends on the element UART 45 is extremely reduced with respect to the same time as may be required by the prior art approaches.

The advantage of the IC card and of the programming process according to the present disclosure is the increasing of the execution speed due to the asynchronous process, which allows storing of the data files into the non-volatile memory while simultaneously other data file are externally received and stored. Another advantage is due to the possibility for carrying out this programming without requiring a change of the equipment to be used and therefore without increasing the production costs.

Another advantage is the possibility to limit the use of the microprocessor during the programming or updating phases, the processor being otherwise employable. Another advantage of the programming process in accordance with the present disclosure is to avoid downtime as well as the possibility of providing a more effective control of the data as stored into the non-volatile memory portion.

Of course, the reduction of the programming time according to the present disclosure is evident when considering the single IC card, but is even more evident if it is considered the storing of programs or streams of instructions from a manufacturer of IC cards in which a multitude of file data should be transferred.

A technician in the field, in order to meet the actual needs, specifications and accessories may make many modifications and variations to the IC card and to the programming process as above described, all within the scope of protection of the present embodiments as defined by the following claims.

That which is claimed:

1. An integrated circuit (IC) card comprising:
   an IC card substrate; and
   an IC carried by said IC card substrate and comprising
      non-volatile memory portions configured to store a plurality of external data files,
      volatile memory portions, and
      an IC card serial interface configured to store the plurality of external data files into said volatile memory portions,
      said volatile memory portions comprising at least one internal register configured to be programmed through said IC card serial interface for managing a serial storing into said non-volatile memory portions of the plurality of external data files from said volatile memory portions,
      said IC card serial interface and said at least one internal register configured to manage in parallel the respective programming of said volatile memory portions and said non-volatile memory portions.

2. The IC card according to claim 1 further comprising a formatting module configured to transform the plurality of external data files into corresponding data pages stored into said volatile memory portions, each of the data pages having a pre-defined size.

3. The IC card according to claim 1 wherein said at least one internal register comprises a First In, First Out (FIFO) type memory.

4. The IC card according to claim 2 further comprising a storage manager configured to store the data pages in said non-volatile memory portions based upon the programming of said at least one internal register, and a controller to control said storage manager and said at least one internal register independently with respect to said IC card serial interface.

5. The IC card according to claim 4 wherein said storage manager comprises a Direct Memory Access (DMA) manager (DMA) configured to be interfaced with said at least one internal register.

6. The IC card according to claim 1 wherein said IC card serial interface comprises a Universal Asynchronous Receiver-Transmitter (UART) circuit.

7. An integrated circuit (IC) card comprising:
   an IC card substrate; and
   an IC carried by said IC card substrate and comprising
      first memory portions configured to store
      a plurality of external data files,
      second memory portions, and
      an IC card interface circuit configured to store the plurality of external data files into said second memory portions,
      said second memory portions comprising at least one internal register configured to be programmed through said IC card interface circuit for managing a serial storing into said first memory portions of the plurality of external data files from said second memory portions,
      said IC card interface circuit and said at least one internal register configured to manage in parallel the respective programming of said second memory portions and said first memory portions.

8. The IC card according to claim 7 further comprising a formatting module configured to transform the plurality of external data files into corresponding data pages stored into said second memory portions, each of the data pages having a pre-defined size.

9. The IC card according to claim 7 wherein said at least one internal register comprises a First In, First Out (FIFO) type memory.

10. The IC card according to claim 8 further comprising a storage manager configured to store the data pages in said first memory portions based upon the programming of said at least one internal register, and a controller to control said storage manager and said at least one internal register independently with respect to said IC card interface circuit.

11. The IC card according to claim 10 wherein said storage manager comprises a Direct Memory Access (DMA) manager (DMA) configured to be interfaced with said at least one internal register.

12. The IC card according to claim 7 wherein said IC card interface circuit comprises a Universal Asynchronous Receiver-Transmitter (UART) circuit.

13. A method for programming an integrated circuit (IC) for an IC card comprising non-volatile memory portions for storing a plurality of external data files and volatile memory portions comprising an internal register, the method comprising:
  a first phase, being in a serial mode, of storing of the plurality of external data files in the volatile memory portions for the IC card;
  a second phase, being in the serial mode, of storing based upon programming of the internal register in the non-volatile memory portions of the plurality of external data files stored to the volatile memory portions, the non-volatile memory portions being for the IC card; and
  managing the first phase of serially storing and the second phase of serially storing for the IC card and in parallel with respect to each other.

14. The method according to claim 13 wherein the first phase of serially storing further comprises transforming each of the plurality of external data files into a corresponding data page, each data page having a pre-defined size.

15. The method according to claim 13 wherein the first phase of serial storing comprises:
  using a memory of a First In, First Out (FIFO) type as the internal register; and
  using a universal asynchronous receiver-transmitter (DART) circuit to receive and to store the plurality of external data files.

16. The method according to claim 13 further comprising controlling the first phase of serially storing and the second phase of serially storing independently with respect to each other.

17. A method for programming an integrated circuit (IC) for an IC card comprising first portions for storing a plurality of external data files and second memory portions comprising an internal register, the method comprising:
  storing the plurality of external data files into the second memory portions for the IC card;
  storing, based upon programming of the internal register, in the first memory portions of the plurality of external data files stored to the second memory portions, the first memory portions being for the IC card; and
  managing the storing in the first and second memory portions for the IC card and in parallel with respect to each other.

18. The method according to claim 17 wherein the storing in the second memory portions further comprises transforming each of the plurality of external data files into a corresponding data page, each data page having a pre-defined size.

19. The method according to claim 17 wherein the storing in the second memory portions comprises:
  using a memory of a First In, First Out (FIFO) type as the internal register; and
  using a universal asynchronous receiver-transmitter (UART) circuit to receive and to store the plurality of external data files.

20. The method according to claim 17 further comprising controlling the storing in the first memory portions and the storing in the second memory portions independently with respect to each other.

\* \* \* \* \*

UNITED STATES PATENT AND TRADEMARK OFFICE
CERTIFICATE OF CORRECTION

| | | |
|---|---|---|
| PATENT NO. | : 8,550,363 B2 | Page 1 of 1 |
| APPLICATION NO. | : 12/959945 | |
| DATED | : October 8, 2013 | |
| INVENTOR(S) | : Di Sirio et al. | |

It is certified that error appears in the above-identified patent and that said Letters Patent is hereby corrected as shown below:

Title Page, item (73)   Delete: "STMiroelectronics International N.V.,
                                 Geneva (CH)"
                        Insert: -- STMicroelectronics International N.V.,
                                 Geneva (CH) --

Signed and Sealed this
Twenty-fifth Day of February, 2014

Michelle K. Lee
*Deputy Director of the United States Patent and Trademark Office*